Oct. 28, 1924.
D. W. ONAN
1,513,672
APPARATUS FOR TESTING ELECTRICAL SYSTEMS
Filed Nov. 13, 1920
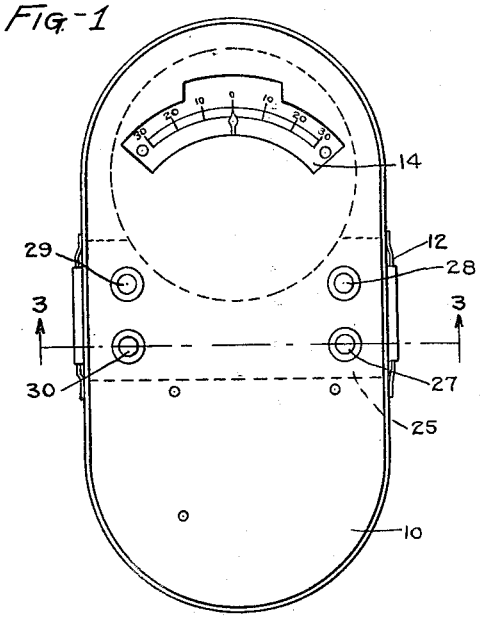
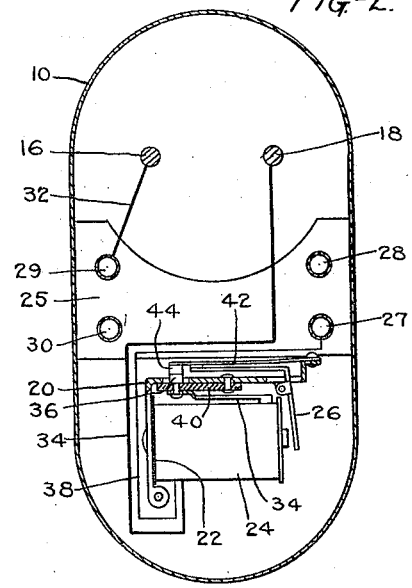
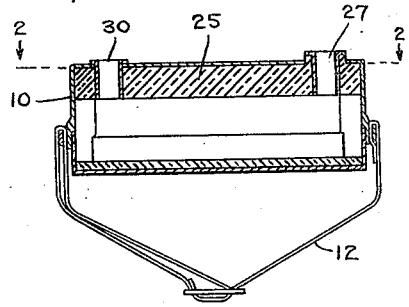
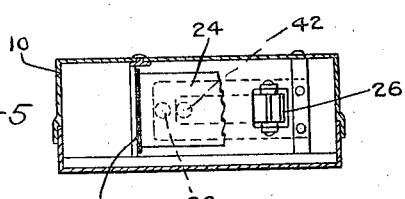
INVENTOR:
DAVID W. ONAN.
By Whiteley and Ruckman
ATTORNEYS.

Patented Oct. 28, 1924.

1,513,672

UNITED STATES PATENT OFFICE.

DAVID W. ONAN, OF MINNEAPOLIS, MINNESOTA.

APPARATUS FOR TESTING ELECTRICAL SYSTEMS.

Application filed November 13, 1920. Serial No. 423,834.

*To all whom it may concern:*

Be it known that I, DAVID W. ONAN, a citizen of the United States, residing at Minneapolis, in the county of Hennepin and State of Minnesota, have invented certain new and useful Improvements in Apparatus for Testing Electrical Systems, of which the following is a specification.

My invention relates to apparatus for testing electrical systems. An object of the invention is to provide a device for this purpose which may be constructed with sufficient compactness to be worn by the operator in the same manner as a wrist watch. Another object is to provide a device which will enable the operator to detect anything in the way of trouble and to locate the different difficulties that occur in the electrical equipment of motor vehicles. My apparatus embodies a meter, preferably an ammeter, and an automatic device to protect the meter against the overload encountered while testing. This automatic device preferably consists of a buzzer which will indicate instantly a circuit when encountered and which makes it possible for the operator to proceed with the testing and diagnosing of trouble without the necessity of watching the instrument. With my combination, it is possible to make every test necessary in connection with an electrical system, with the exception of the capacity of the battery, and this latter is easily determined by simply turning on the lights and trying the starter. I preferably employ an ammeter in my combination since a voltmeter must be built large in order to be of value and should, therefore, be in a separate unit.

The full objects and advantages of my invention will appear in connection with the detailed description thereof, and the novel features embodied in my inventive idea will be particularly pointed out in the claims.

In the accompanying drawings which illustrate one embodiment which my invention may assume, Fig. 1 is a top plan view of the apparatus. Fig. 2 is a view in horizontal section on the line 2—2 of Fig. 3 with the ammeter removed except the posts thereof indicated in section. Fig. 3 is a view in transverse section on the line 3—3 of Fig. 1. Fig. 4 is a fragmentary view corresponding to a portion of Fig. 2, but with certain parts shown in elevation instead of in section. Fig. 5 is a view in transverse section substantially on the line 5—5 of Fig. 4 looking in the direction of the arrows. Fig. 6 is an elevational view of one of a pair of cables and points used in connection with my apparatus for testing. Referring to the particular construction shown in the drawings, the numeral 10 designates a suitable metallic case provided with a strap 12 by means of which the apparatus may be attached to the wrist of an operator in the manner of a wrist watch. The case 10, as will be seen from Figs. 3 and 5, is comparatively shallow with flat top and bottom walls and the peripheral wall is oval in shape. Mounted in the case at one end thereof is an ammeter 14 of usual construction having posts 16 and 18. Attached to the case at the other end thereof is an angle member 20 on one arm of which is a piece of insulating material 22 to which is attached an electromagnet 24. An armature 26, having a bent-in portion is pivoted to the other arm of the angle member 20. Between the ammeter and the electromagnet is an insulating strip 25 which is secured to the cover portion of the case. This insulating strip carries four sockets 27, 28, 29 and 30, the sockets 27, 28 and 29 being insulated from the case, and the socket 30 being in contact with the case so as to be grounded thereon, as indicated in Fig. 3. The ammeter post 16 is connected to the insulated socket 29 by a coarse wire 32, while to the ammeter post 18 is connected one end of a coarse insulated wire 34, the other end portion of which is coiled around the core of the electromagnet 24 and is then secured to a contact member 36. To the insulated socket 27 is connected one end of a fine wire 38, the other end portion of which is also coiled around the core of the electromagnet and is then secured to the contact member 36, together with the wire 34. The contact member 36 is carried by a strip of insulating material 40 which is secured to the support or angle member 20 previously referred to and which is a metallic member in contact wth the case. A leaf spring 42 is secured to a lug on member 20, and this leaf spring engages the bent arm of the armature 26 so as to retract the latter when not attracted by the electromagnet. A contact 44 carried by the free end of the spring 42 engages the contact 36 when the armature is retracted. When the armature is attracted, its bent end lifts the contact 44 from the contact 36 so as to alternately make and break the circuit at this place, thus causing the electromagnet and its armature to operate as a buzzer. In order to use the apparatus for testing purposes, a pair of devices one of which is shown in Fig. 6 is used. Each of these devices has a plug 46 which is connected by a wire 48 to a test point or similar element 50.

The operation and advantages of my invention will be understood from the foregoing description. When the operator wishes to use the ammeter in connection with a test for locating trouble in electrical circuits, he inserts one of the plugs 46 in the socket 29 and the other plug in the socket 30. The two points 50 may then be placed in contact with different points of the electrical circuit to be tested. If there is no trouble in the circuit up to the points engaged, current will pass from one of the points 50 to the socket 29 through the wire 32, through the ammeter and the wire 34, through the contacts 36 and 44 to the metal of the case and from the socket 30 back to the other test point. This causes an indication on the dial of the ammeter, but the current passing through the coarse winding will not cause the buzzer to operate unless the amount of current encountered exceeds the capacity of the ammeter. In the latter case, the buzzer starts to operate and acts to prevent injuring the ammeter. If it is desired to use the buzzer without the ammeter, then the plugs are inserted in the sockets 27 and 30. If there is current at the place being tested, this current will flow through the socket 27, through the wire 38, through the contacts 36 and 44 and back from the socket 30. This causes the buzzer to operate. It is, of course, obvious that the current will pass in the opposite direction in both cases if the position of the contact points is reversed. Since the socket 28 is insulated and not connected to either the buzzer or ammeter, it may be used to hold in place one of the plugs 46 so as to make suitable terminals between the sockets 27 and 28, thus making it possible to connect these sockets with a lamp or fuse or other element which it is desired to test. The ends of the fuse or the terminals of the lamp will be placed in contact with these two last mentioned sockets. Another plug 46 is inserted in the socket 30 and the contact member 50 which is connected therewith is connected to one terminal of a source of electricity, the contact member 50 which is connected with the plug 46 mounted in the socket 28 being connected with the other terminal of the source of electricity. It is obvious that the connection is now through the fine wire 38 which cuts down the current so that there is no danger of blowing the fuse in case fuses are being tested. When the device is used for testing in this manner, the buzzer is utilized but the ammeter is not. In use of the apparatus, it is frequently not as important to know the exact amount of current passing through a circuit as to know whether or not there is a complete circuit. Therefore, many of the desired tests can be made with the use of the buzzer without using the ammeter. In order to determine which way the current is passing, for instance in testing a generator, the ammeter is tried before starting the test, and connections are made so that it indicates discharge when the generator is idle. The charging rate will be indicated on the opposite side of the dial when the generator is operative.

I claim:

1. Apparatus for testing electrical systems comprising a case, an ammeter mounted in said case, a buzzer mounted in said case, a coil of coarse wire for said buzzer connected to one post of said ammeter, a coil of fine wire for said buzzer, means whereby said ammeter and said coil of coarse wire may be connected in the circuit to be tested, and means whereby said coil of fine wire may be connected separately in said circuit.

2. Apparatus for testing electrical systems comprising a case, an ammeter mounted in said case, a buzzer mounted in said case, a coil of coarse wire for said buzzer connected to one post of said ammeter, an insulated plug contact member mounted in said case and connected to the other post of said ammeter, a grounded plug contact member on said case, said contact members serving to connect said ammeter and said coil of coarse wire in the circuit to be tested, a second insulated plug contact member on said case, and a coil of fine wire for said buzzer connected to said second insulated contact member, said second mentioned insulated contact member and said grounded contact member serving to connect said buzzer separately in said circuit.

3. Apparatus for testing electrical systems comprising a case, an ammeter mounted in said case, a buzzer mounted in said case, a coil of coarse wire for said buzzer connected to one post of said ammeter, an insulated plug contact member mounted in said case and connected to the other post of said ammeter, a grounded plug contact member on said case, said contact members serving to connect said ammeter and said coil of coarse wire in the circuit to be tested, a second insulated plug contact member on said case, a coil of fine wire for said buzzer connected to said second insulated contact member, said second mentioned insulated contact member and said grounded contact member serving to connect said buzzer separately in said circuit, and a third insulated plug contact member on said case, said second and third insulated contact members serving for testing independently of said ammeter.

In testimony whereof I hereunto affix my signature.

DAVID W. ONAN.